United States Patent [19]
Smith

[11] Patent Number: 5,245,122
[45] Date of Patent: Sep. 14, 1993

[54] METHOD AND MIXTURE FOR TREATING ELECTRIC ARC FURNACE DUST

[75] Inventor: Charles L. Smith, Conshohocken, Pa.

[73] Assignee: Conversion Systems, Inc., Horsham, Pa.

[21] Appl. No.: 936,029

[22] Filed: Aug. 26, 1992

[51] Int. Cl.$^5$ .............................................. C04B 7/28
[52] U.S. Cl. .................... 588/257; 106/791; 75/323; 75/773; 423/DIG. 20
[58] Field of Search ............... 588/249, 254, 256, 257; 405/266; 106/791; 75/319, 323, 326, 746, 773; 423/DIG. 20

[56] References Cited

U.S. PATENT DOCUMENTS

| | | | |
|---|---|---|---|
| Re. 29,783 | 9/1978 | Smith et al. | 210/59 |
| 3,488,203 | 1/1970 | Andersson | 106/791 X |
| 4,613,374 | 9/1986 | Smith | 106/118 |
| 4,840,671 | 6/1989 | Lynn et al. | 106/85 |
| 4,889,640 | 12/1989 | Stanforth | 210/751 |
| 4,911,757 | 3/1990 | Lynn et al. | 106/85 |
| 5,037,479 | 8/1991 | Stanforth | 106/691 |
| 5,130,051 | 7/1992 | Falk | 106/739 X |

FOREIGN PATENT DOCUMENTS

| | | | |
|---|---|---|---|
| 53-88032 | 8/1978 | Japan | 588/257 |
| 57-9604 | 2/1982 | Japan | 75/746 |
| 58-156399 | 9/1983 | Japan | 588/257 |
| 59-24102 | 6/1984 | Japan | 75/746 |
| 617423 | 7/1978 | U.S.S.R. | 588/256 |
| 833700 | 6/1981 | U.S.S.R. | 588/256 |
| 969694 | 10/1982 | U.S.S.R. | 588/256 |

Primary Examiner—Dennis L. Taylor
Assistant Examiner—Arlen L. Olsen
Attorney, Agent, or Firm—Ratner & Prestia

[57] ABSTRACT

A method and a mixture for chemically stabilizing electric arc furnace dust (EAFD) by entrapping the metals inherent in EAFD within a cementitiously hardened product from the mixture. The method includes using the pozzolanic characteristics of EAFD and forming a mixture of EAFD with sufficient water and lime, as necessary, and then allowing the mixture to react to form a cementitiously hardened product. The hardened product has acceptable leachate concentrations, permeability characteristics and unconfined compressive strength.

17 Claims, 2 Drawing Sheets

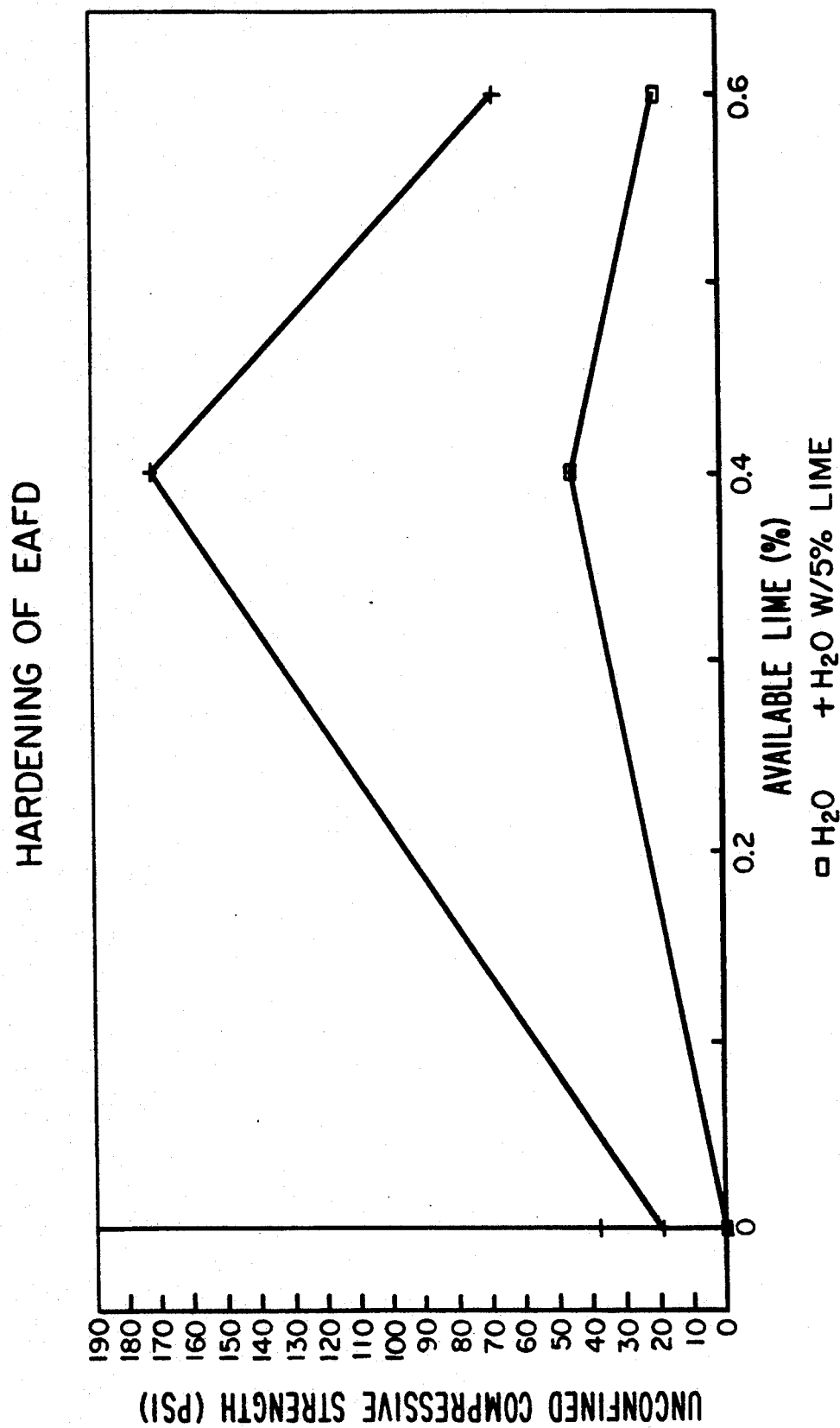

METHOD AND MIXTURE FOR TREATING ELECTRIC ARC FURNACE DUST

FIELD OF THE INVENTION

This invention pertains to a method and a mixture for stabilizing electric arc furnace dust (EAFD). In particular, this invention pertains to entrapping the metals inherent in EAFD within a cementitiously hardened product from the mixture.

BACKGROUND OF THE INVENTION

The electric arc furnace (EAF) process is a common steel making practice in use today. In a typical EAF process, solid charge ingredients including raw scrap, limestone, burnt lime, iron ore and ferro-alloy additives are placed in the top-charge furnace unit.

A conventional furnace unit is equipped with (1) a roof lift and swing arrangement which permits the roof to swing aside when cold scrap is charged into the furnace; (2) a rocker and rail tilting type arrangement which permits the furnace to tilt forward for tapping and backward for slagging; (3) a system for additions through the furnace roof; and (4) evacuation systems for the removal of dust generated during the steel making cycle.

Electrodes are supported by electrode arms and clamps, and project from overhead down through the furnace roof. An electric arc surging between the electrodes and through the furnace charge, typically comprising largely scrap metal, produces heat which melts the charge and refines the steel. The molten steel is tapped, typically at about 3000° F., into a ladle and cast into blooms or poured into ingot molds.

In such a process, particulate emissions are generated during (1) charging of scrap, (2) tapping of furnaces, (3) pneumatic injection of additives, (4) oxygen blowing, and (5) meltdown/refining periods. This particulate, which is individually and collectively referred to as electric arc furnace dust (hereinafter EAFD), is typically collected either as a dry waste in baghouses, or wet, as sludge.

The Environmental Protection Agency (EPA) has classified EAFD as EPA Hazardous Waste No. K061 (emission control dust/sludge from the primary production of steel in electric furnaces). EAFD contains such hazardous constituents as lead, cadmium, and chromium. In order to remove EAFD from the list of hazardous wastes, it must be transformed into a product which does not exceed the following leachate concentration limits (based on the Toxicity Characteristic Leaching Procedure (TCLP) as found in Appendix II of 40 C.F.R. § 261, which is incorporated herein by reference):

| | |
|---|---|
| Arsenic | 0.315 mg/l (maximum) |
| Barium | 6.3 mg/l |
| Cadmium | 0.063 mg/l |
| Chromium | 0.315 mg/l |
| Lead | 0.315 mg/l |
| Mercury | 0.0126 mg/l |
| Selenium | 0.063 mg/l |
| Silver | 0.315 mg/l |

Several methods of chemically stabilizing EAFD have been disclosed. For example, U.S. Pat. Nos. 4,840,671 and 4,911,757 to Lynn et al. disclose a method and a mixture for stabilizing EAFD and similar dusts. The method disclosed in these two references include mixing EAFD with fly ash, lime, and water, among other ingredients. This method relies primarily on the pozzolanic characteristics of fly ash to physically entrap the hazardous constituents of EAFD within a cementitiously hardened product. Neither reference even implies the possibility that EAFD is itself pozzolanic. In fact, the contrary is indicated by the apparently necessary inclusion of fly ash.

In these known systems (of the aforementioned Lynn et al. patents), fly ash is added to the mixture. While the presence of fly ash does provide a pozzolanic set with a reduced permeability, there are operational negatives to using fly ash as an additive. These operational negatives include:

1. a requirement of a fly ash tank or silo and feeding system as part of the processing facility, which is a significant capital cost;
2. an increase in facility operating cost because of the expense of purchasing fly ash;
3. a requirement of additional work in quality control to ensure that the fly ash quality is acceptable for the process; and
4. an increase in volume and in weight of the mixture during treatment, and (as discussed below) in the material ultimately to be placed for final disposal.

The EPA has specifically expressed concern over volume increase in the stabilization of wastes. The addition of fly ash to the composition increases the ultimate weight and volume of the composition. This in turn requires more landfill space. If processed EAFD is to be disposed of off-site, the disposal cost is increased by an amount proportional to the increased weight or volume.

For the reasons stated, eliminating fly ash from the composition would be beneficial to the economics of the process.

Prior efforts to dispose of EAFD include "greenballing," a term which refers to pelletizing EAFD with water, usually in a pan pelletizer. The primary purpose for greenballing is to transform the EAFD from a dust to an agglomerate more suitable for immediate recycling back into the furnace. Also, greenballing has been used to transport the EAFD for disposal at another cite. In some cases, excessive lime was added, which led to expansion and cracking. In other cases where the lime content was too low, the introduction of rain water caused failure. Any possible cementitious reaction of the EAFD, lime and water mixture was neither recognized nor utilized.

SUMMARY OF THE INVENTION

The present invention is a method and a mixture for treating electric arc furnace dust (EAFD). The method includes forming a mixture of EAFD, and water, in predetermined proportions as necessary, and about 2-12% available lime (wet weight basis), and then allowing the mixture to react to form a cementitiously hardened product with acceptable leachate properties. The mixture of EAFD, lime, and water is adapted to form a cementitiously hardened product because of the pozzolanic characteristics of the EAFD itself. Thus, no other pozzolan, such as fly ash, is needed to produce a cementitiously hardened product.

In a preferred embodiment of the present invention, the mixture further includes ferrous sulfate. Preferably, the mixture includes from 6% to 9% available lime. Generally, the mixture includes at least 70% EAFD, and about 10% to 25% water. Preferably, the mixture is about 15% water. The preferred water content is just below that amount sufficient to produce an optimum density mixture.

BRIEF DESCRIPTION OF THE DRAWING

FIG. 2 is a graph of unconfined compressive strength in several cementitiously hardened mixtures versus available lime for two sets of mixtures, one set with lime added and one set without lime added.

DETAILED DESCRIPTION OF THE INVENTION

Figure 1:
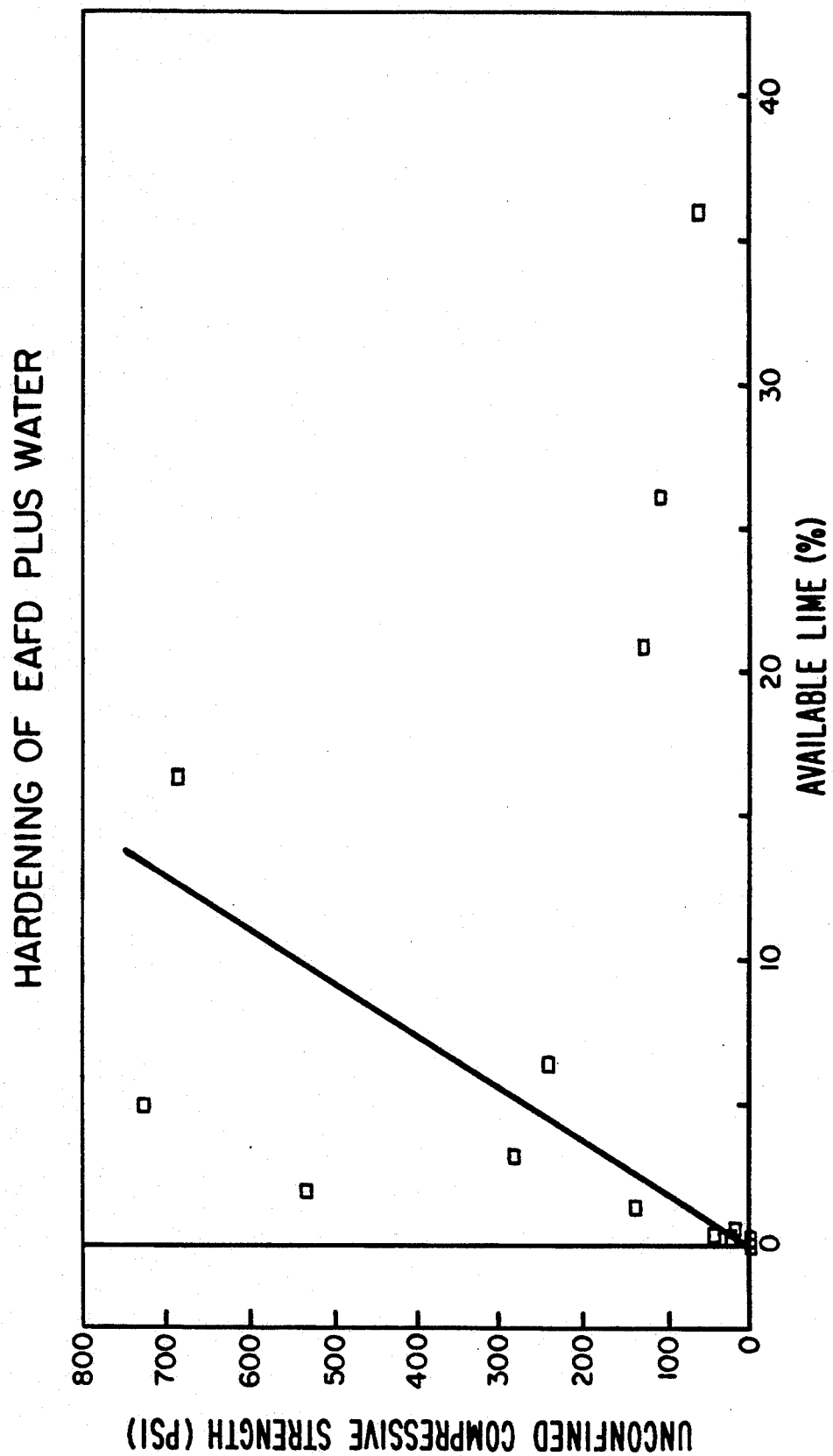
FIG. 1 is a graph of unconfined compressive strength in several cementitiously hardened water-EAFD mixtures versus available lime content in the mixtures.

The present invention utilizes the pozzolanic nature of EAFD. Chemical stabilization of EAFD is accomplished by forming a mixture of EAFD with sufficient water and lime, in predetermined proportions, as necessary, and then forming a cementitiously hardened product by permitting the mixture to cementitiously react. In some cases the EAFD may itself contain sufficient reactive lime. In such cases no additional lime, or less additional lime, is required.

EAFD is defined as the solid matter emitted from an electric arc furnace. As previously stated, these emissions occur during various phases of the operation of an electric arc furnace including:
(1) charging of scrap;
(2) tapping of furnaces;
(3) pneumatic injection of additives;
(4) oxygen blowing; and
(5) meltdown/refining periods.

EAFD is the dust removed during any one of the above operations or a collection from any combination thereof. EAFD may be collected as a dry waste or wet, as a sludge. In its emitted form, EAFD readily leaches when wet, producing leachate concentrations which exceed the limits as set forth by the EPA. The EPA's Toxicity Characteristic Leaching Procedure (TCLP) described in Appendix II in 40 C.F.R. § 261, incorporated herein by reference, generally yields EAFD leachate concentrations for lead, cadmium and chromium which exceed the EPA maximum limits.

As stated above, the present invention makes use of the pozzolanic characteristics of EAFD. A "pozzolan" has been defined as a siliceous or aluminum-siliceous material that in itself has little or no cementitious value, but that in finely divided form and in the presence of moisture will chemically react with alkali metal and alkaline-earth metal hydroxides at ordinary temperatures to form or assist in forming compounds possessing cementitious properties. See ASTM Designation: C 593-89, entitled "Standard Specification for Fly Ash and other Pozzolans for use with Lime," incorporated herein by reference.

It has been found as indicated in the experiments disclosed in the Examples below that EAFD is a pozzolan. The lowest EAFD content tested was 41% (wet weight basis, i.e. weight of constituent divided by total weight of mixture, including weight of water). Although the lowest EAFD content tested was 41%, there is no indication that mixtures having less than 41% EAFD will not be pozzolanic. At EAFD concentrations above 70%, there is a substantial improvement in properties, particularly in minimizing weight and volume increase during reaction.

Some EAF dusts are not only pozzolanic, but also may contain sufficient lime to be self activating. The term "auto-pozzolan" or "cement" is appropriate for these types of EAF dusts. The amount of lime required for a mixture to be an "auto-pozzolan" is about 0.5% "available lime" (dry weight basis), usually calculated in terms of calcium oxide (CaO) equivalent, as described in Section 33 of ASTM Designation: C 25-91, entitled "Standard Test Methods for Chemical Analysis of Limestone, Quicklime, and Hydrated Lime." For purposes of the invention, the term "available lime" includes both the lime available for reaction inherent in an EAFD sample plus any added lime which is available for reaction as discussed in ASTM designation: C 25-91.

When water has been added, the available lime is generally given as a wet weight basis. On the other hand, when discussing the amount of lime inherent in EAFD, the available lime is generally given as a dry weight basis, i.e. weight of constituent divided by total weight of the dry mixture. The available lime content of a mixture should not exceed about 12% (wet weight basis), above which point damage due to expansion occurs. An EAFD sample may be supplemented with additional lime to produce a predetermined available lime concentration in the reactive mixture, within the 2-12% (wet weight basis) range. In such cases, lime is preferably added in the form of hydrated lime for improved dispersion throughout the mixture. Preferably, the available lime content is adjusted to be within the range of 6-9% (wet weight basis).

The operable range of water content is broad. For example, usually no water need be added for the reaction to occur when a wet filtercake (wet collected EAFD, i.e. sludge) is the reactant. The sludge only need include about 10% water (wet weight basis, i.e. weight of water divided by the total wet weight of the mixture). On the other hand, the reactants will still form a cementitiously hardened product if the mixture contains as much as 25% water. The preferred water content is about 15%.

The preferred water content may also be determined as the water content slightly less than that sufficient to permit the mixture to achieve an optimum density with compaction. "Optimum density" is the maximum density achievable in a mixture of fixed solids content, as water content varies. When a mixture is at its optimum density, there is just enough water to fill all of the interstitial sites. At a water content below this point, voids remain in the interstitial sites. At a water content above this point, the density of the mixture decreases because excessive water increases the volume of the mixture by enlarging the volume of the interstitial sites. Generally, some compaction of the mixture is required to produce this highly densified, optimum or maximum density state.

Preferably, ferrous sulfate may be added to the mixture. Ferrous sulfate may be added as a crystal or as a solution. The operable range of ferrous sulfate is broad. Experiments, as discussed in the Examples below, include adding a 30% ferrous sulfate solution in a range of from 0% to about 26% (wet weight basis). Ferrous sulfate serves to reduce hexavalent chromium to trivalent chromium. Trivalent chromium can be rendered less soluble than hexavalent chromium and is thus less likely to leach from the cementitiously hardened product. Also, ferrous sulfate assists in the formation of lead sulfate ($PbSO_4$), a less soluble form of lead.

In all cases, the present invention requires allowing a mixture of predetermined composition and proportions to react (or cure) to form a cementitiously hardened product. The compositions must be well-mixed to be reactive. The reaction may be accomplished, for example, by permitting the mixture to react for seven days at 100° F. More commonly, field curing time, equivalent to seven days at 100° F., is used. A typical field curing time may be 30 days at 73° F., for example.

The cementitiously hardened product formed from a mixture of the present invention has unconfined compressive strength and permeability characteristics which indicate a chemically stable product by, for example, relatively low metal ion yields in standard leachate tests. Furthermore, the mixture, during curing, does not undergo a weight and volume increase as large as known stabilization methods and mixtures. Preferably, the cementitiously hardened product of the present invention has lead, cadmium and chromium leachate concentration limits within those required by the EPA.

More specifically, the mixture of the present invention is adapted to form a cementitiously hardened product which produces a leachate having concentrations (as measured by the TCLP discussed above) of no more than: (a) 0.05 milligrams of lead per liter of leachate; (b) 0.01 milligrams of cadmium per liter of leachate; and (c) 0.05 milligrams of chromium per liter of leachate. Also preferably, the mixture of the present invention is adapted to form a cementitiously hardened product having a permeability coefficient within the range of $1 \times 10^{-8}$ to $1 \times 10^{-6}$ cm/sec.

The present invention and the effect of varying the composition of the mixture are more clearly demonstrated by the following Examples.

EXAMPLE 1

Fifteen EAFD samples, from a diverse series of locations, were tested for hardening in the presence of water. The tendency toward hardening was compared with the available lime content in the EAFD.

The hardening characteristics of EAFD were determined by wetting EAFD to a plastic state, and tamping the resulting mass into a two inch diameter by four inch high plastic mold. The molds were sealed to retain moisture. Then, the mixture was cured for seven days at 100° F. The specimens were then soaked in water for four hours before testing for unconfined compressive strength. The unconfined compressive strength of the specimens was determined in accordance with ASTM Test Method C 39.

Table I provides strength data developed from the fifteen samples and FIG. 1 is a graphical display of this data. As shown, unconfined compressive strength generally increases with available lime content (wet weight basis), except at very low (below about 2%) and high (above about 12–16%) available lime content. The unconfined compressive strength for the compositions varied from 0 pounds per square inch (psi) to about 700 psi as available lime content varied from 0.0% to 16.3%. At greater than about 16% available lime content, the unconfined compressive strength fell to about 100 psi. These samples were damaged Whether due to delayed lime hydration or formation of expansive cementing products, the loss of integrity lowered unconfined compressive strength.

TABLE I

HARDENING OF EAFD WITH WATER
(Cured 7 Days @ 100° F.)

| SOURCE | AV CaO (%) | UCS (psi) |
|---|---|---|
| A | 0 | 0 |
| B | 0 | 0 |
| C | 0.3 | 0 |
| D | 0.3 | 25 |
| E | 0.4 | 45 |
| F | 0.6 | 19 |
| G | 1.35 | 138 |
| H | 1.93 | 533 |
| I | 3.2 | 280 |
| J | 4.9 | 726 |
| K | 6.4 | 238 |
| L | 16.3 | 684 |
| M | 20.9 | 128 |
| N | 26.1 | 108 |
| O | 36 | 62 |

As discussed above, Table I indicates a general relationship of increasing unconfined compressive strength with increasing available lime content, over a range of about 2–16% available lime content. In general, the available lime content should be within a range of 2–12%, because damage caused by expansion may occur at available lime contents above 12%.

EXAMPLE 2

It is clear from FIG. 1 that the electric arc furnace dusts are, in general, lime-containing pozzolans or cements (auto-pozzolans). If these are true pozzolans, the addition of lime (in the form of calcium oxide or calcium hydroxide) should increase the strength generated up to a certain level. As previously stated, lime is preferably added in the form of calcium hydroxide (hydrated lime) for improved dispersion throughout the mixture.

To this end, four of the EAF dusts of Example 1, whose available lime content was in the range of 0.0% to 0.6% and which originally yielded relatively little or no unconfined compressive strength, were re-tested. These samples were supplemented by the addition of 5% calcium hydroxide (wet weight basis).

Referring to Table II, it can be seen that the two compositions having no strength before lime addition displayed discernable strength after lime addition. Similarly, two relatively low strength compositions were significantly increased in unconfined compressive strength by the addition of 5% calcium hydroxide. These are clearly pozzolanic.

TABLE II

HARDENING OF SELECTED EAFD BY ADDITION OF
WATER AND LIME (Cured 7 Days @ 100° F.)

| SOURCE | STRENGTH WITH WATER ADDED | UCS WITH WATER AND 5% Ca(OH)$_2$ is ADDED |
|---|---|---|
| B | 0 | 19 |
| A | 0 | 38 |
| F | 19 | 67 |
| E | 45 | 172 |

FIG. 2 is a graphical presentation of Table II. These results demonstrate that a minimum amount of lime is preferred, and in some EAFD samples, lime need be added to produce a cementitiously hardened product. However, if too much lime is added, the possibility of breakage or increased leaching becomes more likely.

It is important to recognize that the three data points of FIG. 2 are for EAFD's from different sources. Thus, no relationship of unconfirmed compressive strength versus available lime should be derived based on these data points.

The purpose of FIG. 2 is to compare the unconfirmed compressive strength for a given EAFD mixture with water added and that for the same EAFD mixture with water and lime added.

EXAMPLE 3

Having proven that EAF dusts are either pozzolanic or cements, experiments were conducted to show that EAFD-water compositions without fly ash have comparable or superior properties to such compositions with fly ash. Physical properties and leachate analyses of compositions with and without fly ash are presented in Table III for various EAFD's.

As shown in Table III, composition 1 is a composition disclosed in U. S. Pat. Nos. 4,840,671 and 4,911,757 to Lynn et al. (the Lynn patents); composition 2 is similar but without fly ash. Compositions 3, 4 and 5 do not include the limekiln dust disclosed in the Lynn patents; composition 3 includes fly ash and compositions 4 and 5 do not include fly ash. The water content and iron sulfate are listed as amount added.

The experimental steps of wetting, tamping, sealing, and curing as discussed in Example 1 were performed as the compositions of Table III from Source "H," a dry dust. Table III provides the data from these experiments.

TCLP discussed above. From the data, it can be seen that eliminating the fly ash has a strong effect on weight and volume increase. Weight increase is reduced from 186% to 144% and volume increase is reduced from 94.2% to 70.4%.

Compositions 3, 4 and 5, all comply with current delisting levels for TCLP leachate analysis, with the lead and chromium contents less than 0.05 mg/l and the cadmium content less than 0.01 mg/l. Also, the weight and volume increase of all three compositions are significantly improved over compositions 1 and 2. Compositions 4 and 5, which do not contain fly ash, represent two unique improvements over the fly ash-containing compositions of the prior art. Composition 4 has superior permeability, while composition 5 has superior strength. Each display superior weight and volume increase

EXAMPLE 4

As further proof that EAFD has acceptable physical and TCLP characteristics even when collected as a wet filtercake (i.e., sludge), experiments were run using compositions having an EAFD sample from Source "B," a wet filtercake. Compositions 1 and 2 are similar, except that Composition 1 includes 10% fly ash and Composition 2 does not include fly ash, but has 10% more EAFD. No water was added to these compositions.

TABLE III

| | SOURCE: H (DRY DUST) | | | | |
|---|---|---|---|---|---|
| | 1 | 2 | 3 | 4 | 5 |
| COMPOSITION DESIGN (Wet Weight Basis) | | | | | |
| EAFD % | 35.0 | 41.0 | 50.0 | 56.3 | 78.0 |
| FLY ASH % | 6.0 | 0.0 | 10.4 | 0.0 | 0.0 |
| LIME % | 6.0 | 6.0 | 6.6 | 6.5 | 5.8 |
| LIMEKILN DUST % | 15.0 | 15.0 | 0.0 | 0.0 | 0.0 |
| $FeSO_4$ (at 30%) | 10.0 | 10.0 | 23.0 | 25.9 | 16.2 |
| WATER % | 28.0 | 28.0 | 10.0 | 11.3 | 0.0 |
| PHYSICAL DATA | | | | | |
| MIX SOLIDS % | 65.5 | 65.6 | 69.9 | 68.2 | 82.3 |
| WET DENSITY (lb/ft$^3$) | 105 | 108 | 121 | 121 | 141 |
| DRY DENSITY (lb/ft$^3$) | 68 | 70 | 89 | 82 | 116 |
| U.C.S. (psi) | 44 | 41 | 213 | 165 | 332 |
| PERM. (cm/sec) | $2.9 \times 10^{-6}$ | $1.8 \times 10^{-6}$ | $7.6 \times 10^{-7}$ | $<1.0 \times 10^{-8}$ | $3.4 \times 10^{-5}$ |
| WEIGHT INCREASE | 186% | 144% | 100% | 78% | 28% |
| VOLUME INCREASE | 94.2% | 70.4% | 29.8% | 8.4% | 2.9% |
| TCLP DATA | | | | | |
| As (mg/l) | <0.05 | <0.05 | <0.05 | <0.05 | <0.05 |
| Ba | <1 | <1 | <1 | <1 | <1 |
| Cd | <0.01 | 0.82 | <0.01 | <0.01 | <0.01 |
| Cr | 0.06 | <0.05 | <0.05 | <0.05 | <0.05 |
| Pb | 2.1 | 1.3 | <0.05 | <0.05 | <0.05 |
| Hg | <0.002 | <0.002 | <0.002 | <0.002 | 0.004 |
| Se | 0.08 | 0.06 | 0.06 | 0.05 | 0.04 |
| Ag | <0.05 | <0.05 | <0.05 | <0.05 | <0.05 |
| Ni | <0.10 | <0.10 | <0.10 | <0.10 | <0.10 |

Physical data determined from the mixture prior to curing includes mixture solids percentage (i.e., the percentage of the mixture which are solids) and wet density (lb/ft$^3$). After curing, the dry density (lb/ft$^3$), unconfined compressive strength (psi) and the permeability coefficient (cm/sec) were determined. Also, the percentage of weight and volume increase during curing were determined, by dividing the difference of the after-cured value minus the before-cured value by the before-cured value.

The products from both compositions 1 and 2 have acceptable, similar physical properties; however, neither complies with the delisting requirements for the The experimental steps of wetting, tamping, sealing, and curing as discussed in Example 1 were performed on these compositions. Table IV provides the data from these experiments. Physical data and TCLP data were determined in the same manner as in Example 3.

TABLE IV

| SOURCE B (WET FILTERCAKE) | |
|---|---|
| 1 | 2 |
| COMPOSITION DESIGN (Wet Weight Basis) | |

TABLE IV-continued

SOURCE B (WET FILTERCAKE)

|  | 1 | 2 |
|---|---|---|
| EAFD % | 72.2 | 82.2 |
| FLY ASH % | 10.0 | 0.0 |
| LIME % | 7.8 | 7.8 |
| FeSO$_4$ (at 30%) | 10.0 | 10.0 |
| WATER % | 0.0 | 0.0 |
| PHYSICAL DATA | | |
| MIX SOLIDS % | 68.7 | 67.1 |
| WET DENSITY (lb/ft$^3$) | 118 | 116 |
| DRY DENSITY (lb/ft$^3$) | 81 | 78 |
| U.C.S. (psi) | 30 | 28 |
| PERM. (cm/sec) | $1.2 \times 10^{-6}$ | $1.0 \times 10^{-6}$ |
| WEIGHT INCREASE | 38% | 22% |
| VOLUME INCREASE | 36% | 19% |
| TCLP DATA | | |
| As (mg/l) | <0.05 | <0.05 |
| Ba | <1 | <1 |
| Cd | <0.01 | <0.01 |
| Cr | <0.05 | <0.05 |
| Pb | <0.05 | <0.05 |
| Hg | <0.002 | <0.002 |
| Se | 0.033 | 0.03 |
| Ag | <0.05 | <0.05 |
| Ni | <0.20 | <0.20 |
| pH | 10.3 | 10.3 |

Table IV shows that the unconfined compressive strength, permeability and the leachate analysis are similar for compositions 1 and 2, while the weight and volume increase is favorable for composition 2, the composition which does not contain fly ash. Therefore, a cementitiously hardened product produced from the present invention is an improvement over the prior art because it minimizes weight and volume increase.

EXAMPLE 5

To confirm the previous results, experiments were run with compositions having an EAFD sample from Source "P," also a wet filtercake. As in Table IV, Composition 1 of Table V includes fly ash while Composition 2 does not. Also, Composition 2 has a slightly reduced ferrous sulfate content. No water was added to the wet filtercake.

The experimental steps of wetting, tamping, sealing, and curing as discussed in Example 1 were performed on these compositions. Table V provides the data from these experiments. Physical data and TCLP data were determined in the same manner as in Examples 3 and 4.

TABLE V

SOURCE p (WET FILTERCAKE)

|  | 1 | 2 |
|---|---|---|
| COMPOSITION DESIGN | | |
| (Wet Weight Basis) | | |
| EAFD % | 70.0 | 85.2 |
| FLY ASH % | 13.0 | 0.0 |
| LIME % | 7.0 | 8.8 |
| FeSO$_4$ (at 30%) | 10.0 | 6.0 |
| WATER % | 0.0 | 0.0 |
| PHYSICAL DATA | | |
| MIX SOLIDS % | 73.8 | 63.8 |
| WET DENSITY (lb/ft$^3$) | 119 | 117 |
| DRY DENSITY (lb/ft$^3$) | 90 | 92 |
| U.C.S. (psi) | 104 | 29 |
| PERM. (cm/sec) | $3.8 \times 10^{-6}$ | $4.7 \times 10^{-7}$ |
| WEIGHT INCREASE | 43% | 17% |
| VOLUME INCREASE | 29% | 15% |
| TCLP DATA | | |
| As (mg/l) | 0.03 | 0.05 |
| Ba | <1 | <1 |
| Cd | <0.01 | <0.01 |
| Cr | 0.05 | <0.05 |
| Pb | <0.05 | <0.05 |
| Hg | <0.002 | <0.002 |
| Se | <0.02 | <0.03 |
| Ag | <0.05 | <0.05 |
| Ni | <0.20 | <0.20 |
| pH | 9.4 | 9.3 |

Table V shows that the leachate analysis are similar for compositions 1 and 2. Although the unconfined compressive strength for the product from composition I was greater than that for composition 2, the permeability of the product from composition 2 was superior to that of composition 1. Also, the weight and volume increase is favorable for composition 2, a composition of the present invention not containing fly ash.

EXAMPLE 6

To confirm the previous results and conclusions that EAFD is a pozzolan with acceptable TCLP data, experiments were conducted using compositions having an EAFD sample from Source "H" also a wet filtercake. Of these compositions, only composition 1 is a prior art composition; it includes fly ash. Compositions 2-7 of the present invention do not include fly ash, but include varying amounts of EAFD, lime, ferrous sulfate and added water.

The experimental steps of wetting, tamping, sealing and curing as discussed in Example 1 were performed on these compositions. Table VI provides the data from these experiments. The only physical data determined here was the solids content. TCLP data was determined in the same manner in Examples 3 through 5.

TABLE VI

SOURCE H

|  | 1 | 2 | 3 | 4 | 5 | 6 | 7 |
|---|---|---|---|---|---|---|---|
| COMPOSITION DESIGN | | | | | | | |
| (Wet Weight Basis) | | | | | | | |
| EAFD % | 50.0 | 56.3 | 75.7 | 78.0 | 84.4 | 76.0 | 76.2 |
| FLY ASH % | 10.4 | 0.0 | 0.0 | 0.0 | 0.0 | 0.0 | 0.0 |
| LIME % | 6.6 | 6.5 | 6.1 | 5.8 | 4.6 | 5.8 | 5.6 |
| FeSO$_4$ sol'n strength | 30 | 30 | 30 | 30 | 0 | 30 | 30 |
| FeSO$_4$ % | 23.0 | 25.9 | 18.2 | 16.2 | 0.0 | 18.2 | 18.2 |
| WATER % | 10.0 | 11.3 | 0.0 | 0.0 | 11.0 | 0.0 | 0.0 |
| PHYSICAL DATA | | | | | | | |
| MIX SOLIDS % | 74 | 72 | 87 | 89 | 89 | 87 | 87 |
| TCLP DATA | | | | | | | |
| As (mg/l) | <0.05 | <0.05 | <0.05 | <0.05 | <0.05 | <0.05 | <0.05 |

TABLE VI-continued

| | SOURCE H | | | | | | |
|---|---|---|---|---|---|---|---|
| | 1 | 2 | 3 | 4 | 5 | 6 | 7 |
| Ba | <1 | <1 | <1 | <1 | <1 | <1 | <1 |
| Cd | <0.01 | <0.01 | <0.01 | <0.01 | 0.03 | 0.01 | 0.04 |
| Cr | <0.05 | <0.05 | <0.05 | <0.05 | 0.12 | 0.16 | 0.08 |
| Pb | <0.05 | <0.05 | 0.09 | 0.03 | <0.05 | <0.05 | <0.05 |
| Hg | <0.002 | <0.002 | <0.002 | 0.004 | <0.002 | <0.002 | <0.002 |
| Se | 0.06 | 0.05 | 0.06 | 0.04 | 0.05 | 0.06 | 0.04 |
| Ag | <0.05 | <0.05 | <0.05 | <0.05 | <0.05 | <0.05 | <0.05 |
| Ni | <0.20 | <0.20 | <0.20 | <0.20 | <0.20 | <0.20 | <0.20 |

Thus, Table VI is further proof that EAFD is a pozzolan, because the leachate analysis was within the EPA parameters for compositions having varying amounts of EAFD.

While this invention has been described with reference to specific embodiments, it is not necessarily limited thereto. Accordingly, the appended claims should be construed to encompass not only those forms and embodiments of the invention specifically described above, but to such other forms and embodiments as may be devised by those skilled in the art without departing from its true spirit and scope.

What is claimed:

1. A composition of matter comprising: a mixture of:
   (a) a cementitious reactant consisting of EAFD,
   (b) sufficient water to react with said EAFD, and
   (c) 2–12% available lime measured on a wet weight basis, adapted to form a cementitiously hardened product.

2. The composition of matter of claim 1 wherein said mixture further includes ferrous sulfate.

3. The composition of matter of claim 1 wherein said mixture includes at least 70% EAFD.

4. The composition of matter of claim 3 wherein said mixture includes 6–9% available lime measured on a wet weight basis.

5. The composition of matter of claim 3 wherein said mixture includes approximately 15% water.

6. The composition of matter of claim 1 wherein said mixture includes sufficient water to permit said mixture to obtain its optimum density under compaction.

7. The composition of matter of claim 1 wherein said mixture is adapted to form a cementitiously hardened product, which produces a leachate, from the Toxicity Characteristic Leaching Procedure of Appendix II of the Jul. 1, 1989 edition of 40 C.F.R. § 261, said leachate having concentrations of no more than:
   0.315 milligrams of arsenic per liter of leachate;
   6.3 milligrams of barium per liter of leachate;
   0.063 milligrams of cadmium per liter of leachate;
   0.315 milligrams of chromium per liter of leachate.
   0.315 milligrams of lead per liter of leachate;
   0.126 milligrams of mercury per liter of leachate;
   0.063 milligrams of selenium per liter of leachate; and
   0.315 milligrams of silver per liter of leachate.

8. The composition of matter of claim 1 wherein said mixture is adapted to form a cementitiously hardened product having a permeability coefficient within the range of $1 \times 10^{-8}$ to $1 \times 10^{-6}$ cm/sec.

9. A method of treating EAFD to reduce the concentration of hazardous constituents in leachate therefrom comprising the steps of:
   forming a mixture of water, 2% to 12% available lime measured on a wet weight basis and a cementitious reactant consisting of said EAFD;
   and permitting said mixture to react and form a cementitiously hardened product.

10. The method of claim 9 wherein said method further includes the step of adding ferrous sulfate to said mixture.

11. The method of claim 9 wherein said mixture includes at least 70% EAFD.

12. The method of claim 11 wherein said mixture includes 6–9% available lime measured on a wet weight basis.

13. The method of claim 11 wherein said mixture includes approximately 15% water.

14. The method of claim 9 wherein said method further includes adding sufficient water to permit said mixture to obtain its optimum density and compacting said mixture to permit the mixture to obtain its optimum density.

15. The method of claim 9 wherein said mixture is adapted such that said cementitiously hardened product produces a leachate, from the Toxicity Characteristic Leaching Procedure of Appendix II of the Jul. 1, 1989 edition of 40 C.F.R. § 261, said leachate having concentrations of:
   0.315 milligrams of arsenic per liter of leachate;
   6.3 milligrams of barium per liter of leachate;
   0.063 milligrams of cadmium per liter of leachate;
   0.315 milligrams of chromium per liter of leachate.
   0.315 milligrams of lead per liter of leachate;
   0.0126 milligrams of mercury per liter of leachate;
   0.063 milligrams of selenium per liter of leachate; and
   0.315 milligrams of silver per liter of leachate.

16. The composition of matter of claim 9 wherein said mixture is adapted to form a cementitiously hardened product having a permeability coefficient of within the range of $1 \times 10^{-8}$ to $1 \times 10^{-6}$ cm/sec.

17. A product produced in accordance with the method of claim 9.

* * * * *

UNITED STATES PATENT AND TRADEMARK OFFICE
CERTIFICATE OF CORRECTION

PATENT NO. : 5,245,122
DATED : September 14, 1993
INVENTOR(S) : Smith

It is certified that error appears in the above-indentified patent and that said Letters Patent is hereby corrected as shown below:

Column 11, line 55, claim 7, delete "0.126" and insert therefor —0.0126—.

Signed and Sealed this

Nineteenth Day of April, 1994

Attest:

BRUCE LEHMAN

Attesting Officer

Commissioner of Patents and Trademarks